US012629551B2

(12) United States Patent
Silva, Jr. et al.

(10) Patent No.: US 12,629,551 B2
(45) Date of Patent: May 19, 2026

(54) COMBUSTIBLE CONCEALED SPACE

(71) Applicant: Tyco Fire Products LP, Cranston, RI (US)

(72) Inventors: Manuel R. Silva, Jr., Cranston, RI (US); Sean E. Cutting, West Warwick, RI (US); Patrick Hoefner Crowe, Pawtucket, RI (US)

(73) Assignee: Tyco Fire Products LP, Cranston, RI (US)

( * ) Notice: Subject to any disclaimer, the term of this patent is extended or adjusted under 35 U.S.C. 154(b) by 273 days.

(21) Appl. No.: 18/210,971

(22) Filed: Jun. 16, 2023

(65) Prior Publication Data

US 2023/0330462 A1 Oct. 19, 2023

Related U.S. Application Data

(63) Continuation of application No. 16/895,072, filed on Jun. 8, 2020, now Pat. No. 11,707,641, which is a continuation of application No. 14/869,653, filed on Sep. 29, 2015, now Pat. No. 10,675,492.

(60) Provisional application No. 62/058,021, filed on Sep. 30, 2014.

(51) Int. Cl.

| | |
|---|---|
| ***A62C 35/68*** | (2006.01) |
| ***A62C 3/00*** | (2006.01) |
| ***A62C 35/62*** | (2006.01) |
| ***A62C 37/14*** | (2006.01) |

(52) U.S. Cl.

CPC ................ *A62C 35/62* (2013.01); *A62C 3/00* (2013.01); *A62C 35/68* (2013.01); *A62C 37/14* (2013.01)

(58) Field of Classification Search

CPC .. A62C 2/00; A62C 3/00; A62C 35/58; A62C 35/00; A62C 35/60; A62C 35/62; A62C 35/64; A62C 3/16

See application file for complete search history.

(56) References Cited

U.S. PATENT DOCUMENTS

| | | | |
|---|---|---|---|
| 5,865,256 | A | 2/1999 | Pounder |
| 7,584,802 | B1 | 9/2009 | Fischer |
| 8,083,002 | B1 | 12/2011 | Golinveaux et al. |

(Continued)

FOREIGN PATENT DOCUMENTS

| | | | |
|---|---|---|---|
| WO | WO-2014/047485 | A2 | 3/2014 |
| WO | WO-2014/047499 | A2 | 3/2014 |

OTHER PUBLICATIONS

Fire Protection Series—Automatic Sprinklers: Sprinklers Temperature Ratings (Year: 2010).*

(Continued)

*Primary Examiner* — Tuongminh N Pham

(74) *Attorney, Agent, or Firm* — Foley & Lardner LLP

(57) ABSTRACT

Fire protection system and methods for concealed spaces providing for effective fire protection over an effective depth range measuring from a minimum six inches up to a maximum that is greater than thirty-six inches. A combustible concealed space that includes an upper deck and a ceiling deck spaced about a longitudinal axis extending substantially parallel to the ceiling deck with a fire protection system having a firefighting fluid supply pipe and at least one automatic upright sprinkler coupled to the fluid supply pipe and positioned to define an effective depth range that measures from six inches to a maximum of at least sixty inches.

26 Claims, 4 Drawing Sheets

(56) References Cited

U.S. PATENT DOCUMENTS

| | | | |
|---|---|---|---|
| 11,590,371 | B2 | 2/2023 | Workman et al. |
| 2001/0042795 | A1 | 11/2001 | Franson et al. |
| 2002/0096580 | A1 | 7/2002 | Pahila |
| 2009/0078432 | A1 | 3/2009 | Tow et al. |
| 2011/0036598 | A1 | 2/2011 | Pahila |

OTHER PUBLICATIONS

Tyco Technical Data Sheet of the Model CC2 â-4.2 and 5.6 K-factor Combustible Concealed space Sprinklers Specific Application, Upright (Year: 2005).*

NFPA 13: Standard for the Installation of Automatic Sprinkler Systems (2013 ed.) Section 8.15.1, pp. 13-83-13-85.

Tyco—Model CC2—4.2 and 5.6 K-Factor Combustible Concealed Space Sprinklers Specific Application, Upright—Mar. 2005.

Tyco Fire Protection Products datasheet, Model CC2—4.2 and 5.6 K-factor Combustible Concealed Space Sprinklers™ Specification Application, Upright, TFP632, Mar. 2014 8 pp.

Tyco Fire Protection Products datasheet, Model CC2—4.2 and 5.6 K-factor Combustible Concealed Space Sprinklers™ Specification Application, Upright, TFP633, Jul. 2015 8 pp.

Wilkins, Roger, Application: The Use of Specific Application Sprinklers for Protecting Attic, p. 7, December (Year: 2007).

Grinnell Corporation—Intermediate Level Sprinkler, Model F950 Solder Type, 1/2" Orifice, A Tyco International Ltd. Company, 1983 (2 pages).

Grinnell Corporation—Intermediate Level Sprinklers, Model FR-1, Fast Response Solder Type, 1/2" Orifice, A Tyco International Ltd. Company, 1988 (2 pages).

ICC—2000 International Building Code, International Code Council (7 pages).

Reliable: Model KFR-CCS 56 Combustible Concealed Space Upright Sprinkler; Sprinkler Identification Number (SIN): RA4454, The Reliable Automatic Sprinkler Co., Inc. (pp. 1-12).

The National Fire Protection Association—Public Input No. 256-NFPA 13-2013 [New Section after 8.15.1.6] Submitter Full Name: Roland Huggins Organization: American Fire Sprinkler Association, Submittal Date: Feb. 26, 2013 (1 pages).

Tyco/Fire & Building Products—Model CC1—2.8 K-factor Combustible Concealed Space SprinklersTM Specific Application, Upright, TFP630, Sep. 2003 (pp. 1-8).

Viking—Microfast Coin—TM, QR Upright Fusible Element Sprinkler SIN VK901 (Specific Application) Oct. 14, 2005 (pp. 1-6).

Viking—Microfast Coin—TM, Quick Response Upright Sprinkler SIN VK900 (Specific Application) Dec. 5, 2003 (pp. 1-6).

* cited by examiner

COMBUSTIBLE CONCEALED SPACE

PRIORITY CLAIM & INCORPORATION BY REFERENCE

This application is a continuation of U.S. patent application Ser. No. 16/895,072, filed Jun. 8, 2020, which is a continuation of U.S. patent application Ser. No. 14/869,653, filed Sep. 29, 2015, which claims the benefit of U.S. Provisional Application No. 62/058,021, filed Sep. 30, 2014, each of which is incorporated by reference in its entirety.

TECHNICAL FIELD

The present invention relates generally to combustible concealed space and fire protection systems for combustible concealed space.

BACKGROUND ART

Known concealed spaces and fire protection systems are shown in Tyco Fire Protection Products' publication, TFP632: "Model CC2-4.2 and 5.6 K-Factor Combustible Concealed Space Sprinklers Specific Application, Upright" (March 2014) (hereinafter "TFP632"). The concealed space is defined as the space between an upper deck and a ceiling deck, which separates the concealed space from an adjacent area below the ceiling deck. As shown in TFP632, the construction of the concealed space can employ spaced apart truss or bar joist members that extend from the upper deck to the ceiling deck (FIGS. 2, 4 and 7 of TFP632) with a top chord engaged with the upper deck and a bottom chord engaged with the ceiling deck thereby interconnecting the upper and ceiling decks. The top chord extends from the upper deck into the concealed space and terminates at a bottom surface of the top chord. The bottom chord extends from the ceiling deck into the concealed space and terminates at a top surface of the bottom chord. The concealed space can be alternatively constructed with joist members (FIGS. 3, 5 and 6 of TFP632) spaced along the upper deck and separate joist members spaced along the ceiling deck. The upper deck joist members extend from the upper deck into the concealed space and terminate at a bottom surface of the upper deck joist members. The ceiling deck joist members extend from the ceiling deck into the concealed space and terminates at a top surface of the ceiling joist members.

Fire protection systems for concealed spaces employ automatic sprinklers located about the concealed space to address a fire. Known concealed space automatic sprinklers include a frame body having an inlet for receipt of the firefighting fluid, an outlet with a passageway extending between the inlet and the outlet to define a discharge coefficient of a nominal K-Factor of either 4.2 gpm/psi$^{1/2}$ or 5.6 gpm/psi$^{1/2}$. These known automatic sprinklers include a seal assembly supported in the outlet for a controlled release by a thermally responsive trigger. The triggers of known concealed space sprinklers are embodied as thermally responsive glass bulbs. The known trigger and frame body assembly provide for a sprinkler thermal response which can be characterized as "fast response," as is understood in the art. Moreover, the thermal responsiveness of the known concealed space automatic sprinklers can be characterized by a response time index (RTI) of 32 (m-s)½ and a temperature rating of 175° F. These known combustible concealed space sprinklers include a deflector for the distribution of the firefighting fluid. The deflector is a generally planar member with a central portion axially aligned with the passageway and an outer peripheral portion circumscribed about the central portion to define a substantially circular periphery and a diameter of 1$^{11}/_{16}$ inches. The peripheral portion of the deflector includes radially spaced apart tines to define a plurality of open ended slots formed therebetween extending radially inward at an equal distance toward the center of the member. The frame body includes a pair of frame arms diametrically opposed about the outlet to support the deflector spaced from the outlet. The deflector defines the sprinkler-to-sprinkler spacing and maximum coverage areas of the sprinkler. For the known sprinklers, the sprinkler-to-sprinkler spacing ranges from a minimum of seven feet to a maximum of twelve feet with a maximum coverage area of 144 square feet.

The installation, design and performance of these known fire protection systems are limited by the effective depth over which the fire protection system can address a fire. The "effective depth" is defined as the vertical space or distance over which the sprinkler(s) provide fire protection. The effective depth of the sprinkler and its installed position within the concealed space can define an "effective depth range," which is the actual distance over which fire protection is provided within a concealed space as measured between either: (i) the upper and ceiling decks or (ii) between the top and bottom surfaces of opposed chords or joists disposed along the upper and ceiling decks.

Under current industry accepted installation standards such as for example, NFPA 13: Standard for the Installation of Automatic Sprinkler Systems (2013 ed.) ("NFPA 13"), the effective depth range for concealed space fire protection sprinklers is limited. Under Section 8.15.1 of NFPA 13, the installation of fire protection sprinklers for combustible concealed spaces is limited to use where the distance between either: (i) the upper deck and the ceiling deck; or (ii) in the case of joist construction, the distance between the top surface of the bottom joist and the bottom surface of the upper joist is no more than thirty-six inches (36 in.) and the sprinkler is "listed" for such use. Accordingly, the current effective depth range for which concealed space fire protection can be provided using sprinklers is limited to no more than thirty-six inches (36 in.). Under NFPA 13, to be "listed" means that the sprinkler is appropriately published stating that the sprinkler meets appropriate designated standards or has been tested and found suitable for a specified purpose.

For known concealed space fire protection systems, such as those shown in TFP632, the location of the measured maximum thirty-six inch effective depth range limitation is determined at least in part by the construction of the concealed space. For example, truss or bar joist constructions in which the top chord has a vertical length of 4 inches or less, the effective depth range is measured between the upper and ceiling decks. For joist constructions or for truss/bar joist constructions with top chords of greater than 4 inches in vertical length, the effective depth range is measured between the opposed bottom and top surfaces of the respective upper and ceiling joist or chord members.

The automatic sprinklers of known fire protection systems for combustible concealed spaces are upright sprinklers coupled to a supply pipe of firefighting fluid and located within the effective depth range. Thus for example, where the effective depth range has an upper boundary defined by the upper deck, a vertical axis extending from an installed sprinkler first intersects a perpendicular plane that includes the upper deck. The lower boundary of the effective depth range would be the opposed surface at the ceiling deck in a perpendicular plane intersecting the vertical axis extending from the sprinkler. Where the effective depth range has an upper boundary defined by the bottom surface of an upper chord or joist member along the upper deck, a vertical axis extending from the installed sprinkler first intersects a perpendicular plane that includes the bottom surface of the chord or joist member. The lower boundary of the effective depth range would be the opposed top surface of the bottom chord or joist along the ceiling deck in a plane perpendicular to the vertical.

The size of the concealed space itself can be limited because of the maximum thirty-six inch (36 in.) limit for the installation of combustible concealed space fire protection systems. For example, in a first known concealed space configuration with sprinkler protection in which the fluid supply pipe is CPVC pipe and the upper deck defines a slope relative to the ceiling deck that does not exceed 2:12 with one of unobstructed wood truss construction and combustible bar joist construction, the distance between the upper deck and the ceiling deck is limited to a range between a minimum of twelve inches to a maximum of thirty-six inches (12 in.-36 in.). In a second known protected concealed space configuration wherein the fluid supply pipe is CPVC pipe and the upper deck defines a slope relative to the ceiling deck that does not exceed 2:12 with one of non-combustible insulation-filled solid wood or composite wood joist construction, the distance between the joist members is limited to a range between a minimum of six inches to a maximum of thirty-six inches (6 in.-36 in.). In a third known protected concealed space configuration wherein the fluid supply pipe is steel pipe and the upper deck defines a slope relative to the ceiling deck that does not exceed 2:12 with one of unobstructed wood truss construction and unobstructed bar joist construction, the distance between the upper deck and the ceiling deck is limited to a range between a minimum of twelve inches to a maximum of thirty-six inches (12 in.-36 in.).

In three additional alternative known protected concealed space configurations wherein the fluid supply pipe is steel pipe and the upper deck defines a slope relative to the ceiling deck that does not exceed 2:12, with the upper and ceiling decks being any one of (i) solid wood joist construction; (ii) non-combustible insulation-filled solid wood or composite wood joist construction; or (iii) obstructed wood truss construction, i.e. top chord of greater than 4 inches in depth, the distance between the respective joist or chord members is limited to a range between a minimum of six inches to a maximum of thirty-six inches (36 in.).

It is believed that there is a desire to provide fire protection for concealed spaces with greater depths or spacings. By increasing the effective depth range of the fire protection systems, concealed spaces of sizes greater than currently known may be realized.

DISCLOSURE OF INVENTION

Preferred embodiments of a combustible concealed space, its fire protection system and methods for concealed space fire protection provide for effective fire protection over a preferred effective depth range measuring from a minimum six inches up to a maximum that is greater than thirty-six inches. A preferred embodiment provides a combustible concealed space that includes an upper deck and a ceiling deck spaced about a longitudinal axis extending substantially parallel to the ceiling deck with a fire protection system having a firefighting fluid supply pipe and at least one automatic upright sprinkler coupled to the fluid supply pipe and positioned to define an effective depth range that measures from six inches to a maximum of at least sixty inches. In other preferred embodiments, a method of concealed space fire protection includes obtaining, distributing and/or installing an automatic upright sprinkler for coupling to a fluid supply pipe in a concealed space between an upper deck portion and a ceiling deck to provide an effective depth ranging between a minimum of six inches to at least sixty inches. The preferred concealed spaces, concealed space fire protections systems and methods therefore provide for fire protection of concealed spaces at depths greater than previously known. Moreover in one preferred aspect, the concealed spaces, systems and methods provide for a sprinkler-to-sprinkler spacing and maximum sprinkler coverage area that is greater than that of the prior known systems.

In a first preferred concealed space configuration wherein the fluid supply pipe is CPVC pipe and the upper deck defines a slope relative to the ceiling deck that does not exceed 2:12 with one of unobstructed wood truss construction or unobstructed bar joist construction joist construction, the effective depth range between the upper deck and the ceiling deck preferably measures between a minimum of six inches to a maximum of at least sixty inches.

In a second preferred concealed space configuration wherein the fluid supply pipe is CPVC pipe and the upper deck defines a slope relative to the ceiling deck that does not exceed 2:12 with one of non-combustible insulation-filled solid wood or composite wood joist construction, the effective depth range between the upper deck and the ceiling deck joist members preferably measures between a minimum of six inches to a maximum of sixty inches.

In a third preferred concealed space configuration wherein the fluid supply pipe is steel pipe and the upper deck defines a slope relative to the ceiling deck that does not exceed 2:12 with one of unobstructed wood truss construction and unobstructed bar joist construction, the effective depth range between the upper deck and the ceiling deck preferably measures between a minimum of six inches to a maximum of no more than eighty-four inches.

In three additional alternate preferred concealed space configurations wherein the fluid supply pipe is steel pipe and the upper deck defines a slope relative to the ceiling deck that does not exceed 2:12, with the upper and ceiling decks being any one of: (i) solid wood joist construction; (ii) non-combustible insulation-filled solid wood or composite wood joist construction; or (iii) obstructed wood truss construction, i.e. top chord of greater than 4 inches in depth, the effective depth range between the respective joist or chord members preferably measures between a minimum of six inches to a maximum of sixty inches.

In preferred embodiments of the concealed spaces, fire protection systems for concealed spaces or methods thereof, novel automatic sprinkler arrangements provide for the concealed space depths that are greater than previously known. The preferred arrangements include an upright automatic sprinkler having a frame body with an inlet for receipt of a firefighting fluid, an outlet, with a passageway extending between the inlet and the outlet to define a discharge coefficient of a preferred nominal K-Factor of either 4.2 gpm/psi$^{1/2}$ or 5.6 gpm/psi$^{1/2}$.

The preferred frame body includes a pair of frame arms diametrically opposed about the outlet to support a preferred deflector spaced from the outlet. The preferred deflector distributes the firefighting fluid. The deflector is preferably a generally planar member with a central portion axially aligned with the passageway and an outer peripheral portion circumscribed about the central portion to define a substantially circular periphery with a diameter of about 1¾ inches and more preferably of $1^{11}/_{16}$ inches. The peripheral portion of the preferred deflector includes radially spaced apart tines to define a plurality of open ended slots formed therebetween extending radially inward at equal distance toward the center of the member. For the preferred sprinklers, the sprinkler-to-sprinkler spacing preferably ranges from a minimum of seven feet or alternatively a minimum of eight feet to a maximum of fourteen feet with a maximum coverage area of 196 square feet or alternatively to a maximum sprinkler-to-sprinkler spacing of sixteen feet with a maximum coverage area of 256 square feet or further in the alternative, a twenty foot sprinkler-to sprinkler spacing with a maximum coverage area of 400 square feet.

Applicants have discovered that using automatic sprinklers with a preferred activation time in response to a fire can provide for the preferred concealed spaces, systems and methods with increased concealed space effective depth ranges. Applicants have discovered that using automatic sprinklers with a thermal bulb with an increased thermal sensitivity and response can provide for preferred activation time. Applicants' discovery have been verified with appropriate fire and activation testing. In the unactuated state of the preferred automatic sprinkler, a seal assembly is supported in the outlet for a controlled release by a thermally responsive trigger. In one preferred embodiment, the trigger is preferably a thermally responsive glass bulb which is preferably characterized as faster than "fast response", preferably "super-fast" as is understood in the art, with a preferred response time index (RTI) of 24 $(m\text{-}s)^{1/2}$ and a temperature rating of 200° F. Thermally responsive triggers can be alternatively embodied as links or strut and lever assemblies as known in the art. Alternatively or additionally, applicants have discovered that the desired activation and/or thermal responsiveness can be realized by the combination of thermally responsive trigger and appropriate sprinkler body frame geometry that directs heat toward the trigger to provide for the desired activation response. The preferred spaces, systems and methods with the preferred thermal sensitivity and response provide for an increase in concealed space effective depth by as much as 67% over known concealed spaces with known fire protection systems.

A preferred method of combustible concealed space fire protection includes installing a fluid supply line between an upper deck portion and a ceiling deck portion of a combustible concealed space to provide for an effective depth range preferably greater than thirty-six inches (36 in.); and coupling at least one automatic ceiling fire protection with a portion of the supply line substantially parallel to the upper deck and a ceiling for protection over the preferred effective depth range. A method of concealed space fire protection comprising: obtaining an automatic upright sprinkler coupled to a fluid supply pipe including, a frame body having an inlet for receipt of the firefighting fluid, an outlet with a passageway extending between the inlet and the outlet to define a discharge coefficient of a nominal K-Factor, a seal assembly, a thermally responsive trigger to support the seal assembly in the outlet; and a deflector coupled to the frame body and spaced from the outlet for distribution of the firefighting fluid; and distributing the automatic sprinkler for installation in a combustible concealed space to provide for an effective depth range up to at least 60 inches.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
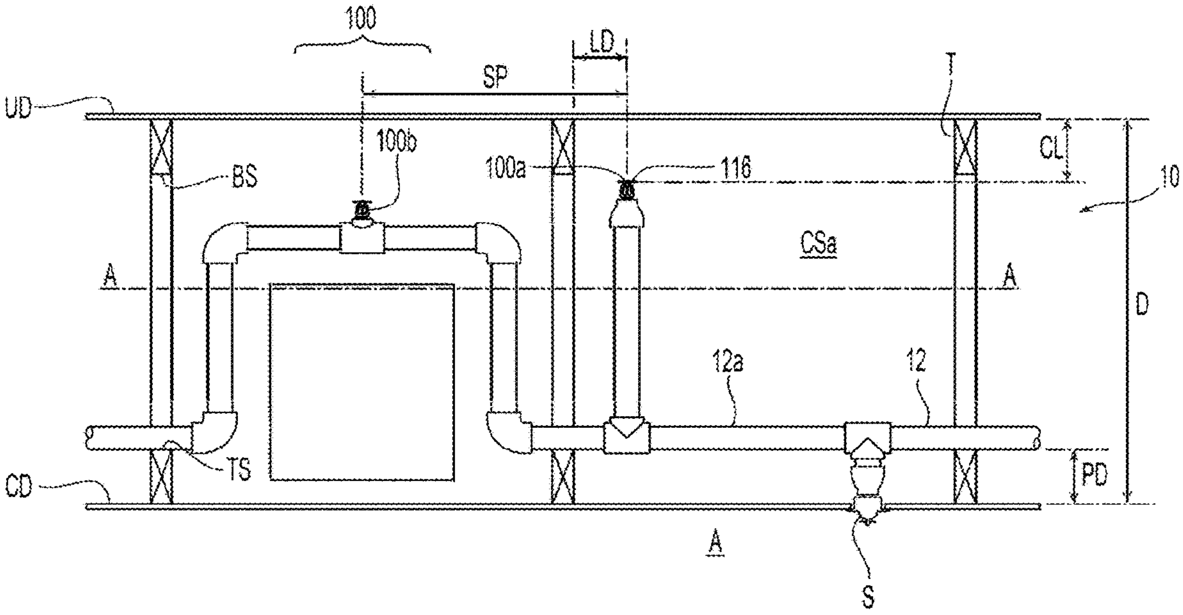
FIG. 1 is a cross-sectional elevation view of a first embodiment of a preferred combustible concealed space and fire protection system.

Shown in FIGS. 1-6 are preferred embodiments of a combustible concealed space CS (CSa, CSb, CSc, CSd, CSe, CSf) having an upper deck UD and a ceiling deck CD spaced about a longitudinal axis A-A extending substantially parallel to the ceiling deck CD. For the preferred concealed spaces and systems described herein the upper deck UD can slope with respect to the ceiling deck at a slope not exceeding 2 inches of rise for each 12 inches of run (2:12). The concealed space CS can be adjacent and more particularly above an area A to be protected by one or more fire protection devices, such as for example, a sprinkler S. The preferred systems 10 generally include a firefighting fluid supply pipe or piping system 12 having a preferably parallel pipe portion 12*a* disposed substantially parallel to the longitudinal axis A-A. The supply pipe 12 is preferably of an appropriate material for use in fire protection systems, such as for example, steel pipe or CPVC pipe to carry the firefighting fluid, such as for example water. The preferred systems 10 includes one or more of a preferred automatic sprinkler 100 (100*a*, 100*b*) preferably coupled to the fluid parallel portion 12*a* of the fluid supply pipe 12. The preferred embodiments described herein provide for previously unknown concealed spaces and systems and methods for the fire protection of concealed spaces in which the effective depth range of the concealed space CS can be measured in a direction perpendicular to the longitudinal axis A-A from a minimum of six inches (6 in.) to a preferred maximum greater than thirty-six inches (36 in.), preferably up to a maximum of at least sixty-inches (60 in.) and in a preferred embodiment up to a maximum of no more than eighty-four inches (84 in.).

Figure 7A:
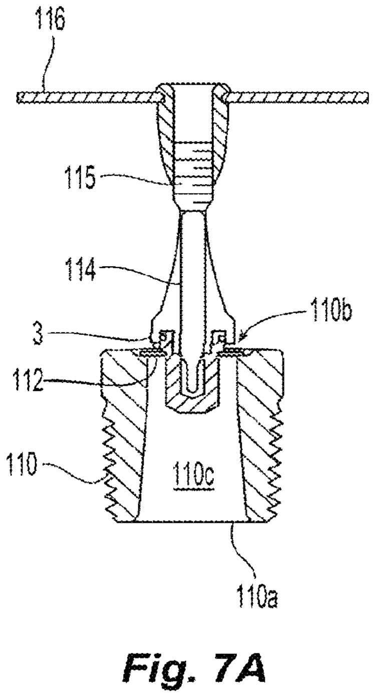
FIGS. 7A & 7B are cross-sectional and elevation views of a preferred automatic sprinkler for use in the systems of FIGS. 1-6.
Figure 7B:
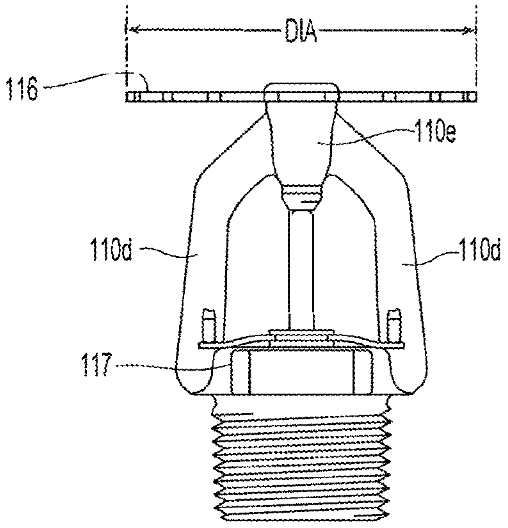
Figure 7C:
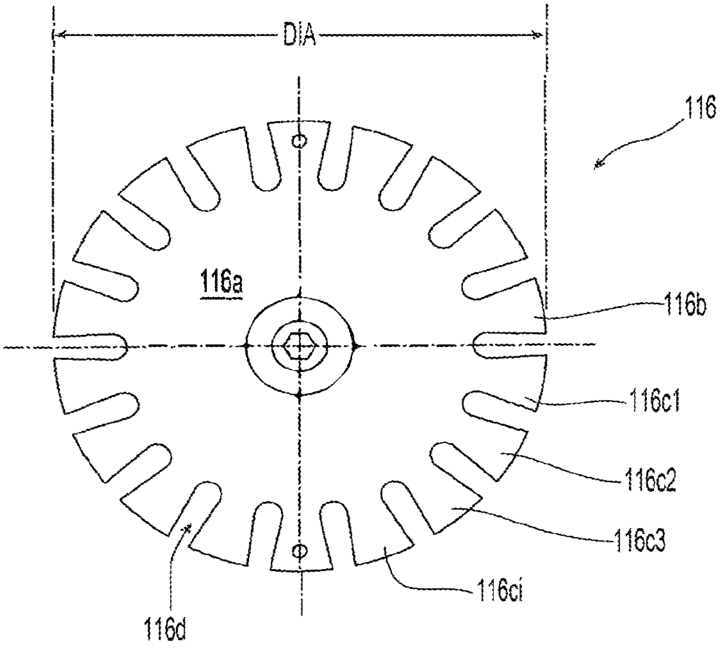
FIG. 7C is a plan view of a preferred deflector for use in the automatic sprinkler of FIGS. 7A & 7B.

Shown in FIGS. 7A and 7B is a preferred embodiment of a preferred automatic sprinkler 100 for use in the preferred methods and systems described herein. The preferred sprinkler 100 generally includes a sprinkler frame body 110 for coupling to a firefighting fluid supply line, an internal seal assembly 112, a thermally responsive trigger 114, and a fluid distribution member 116 for distributing the firefighting fluid to address a fire. The sprinkler frame body 110 includes an inlet 110*a*, an outlet 110*b* with a passageway 110*c* extending between the inlet 110*a* and the outlet 110*b*. The outlet 110*b* and passageway 110*c* define a discharge coefficient of a preferably nominal K-Factor. Preferably, the frame body 110 defines a nominal K-factor of 4.2 gpm/psi$^{1/2}$ or 5.6 gpm/psi$^{1/2}$. Alternatively, the frame body can define a nominal K-Factor of any one of 2.8; 4.2; 5.6; 8.0; and 11.2 gpm/psi$^{1/2}$.

The frame body 110 further preferably includes a pair of frame arms 110*d* diametrically opposed about the outlet 110*b*. The preferred automatic sprinkler 100 includes a deflector 116 supported from and spaced from the outlet 110*b* by the frame arms 110*d*. Once coupled to a fluid supply pipe 12, the preferred deflector 116 and frame body 110 defines a preferred upright orientation. The frame arms 110*d* preferably converge toward an apex, knuckle or trepan 110*e* axially aligned with the passageway and outlet 110*c*, 110*b*. The deflector 116 is preferably engaged with and centered with the knuckle 110*e*. The preferred deflector 116 is a preferably planar member with a central portion 116*a* axially aligned and centered with the passageway 110*c* and an outer peripheral portion 116*b* circumscribed about the central portion 116*a* to define a substantially circular periphery and a diameter DIA of about 1¾ inches, and more preferably 1¹¹⁄₁₆ inches. The preferred peripheral portion 116*b* includes a plurality of spaced apart tines (116*c*1, 116*c*2, 116*c*3, . . . 116*ci*) to define a plurality of open ended slots 116*d* formed therebetween extending radially inward preferably at equal distance toward the central portion 116*a*.

In an unactuated state of the sprinkler 100, the sealing assembly 112 is supported in the outlet 110*b* by the thermally responsive trigger 114 which is preferably embodied as a thermally responsive glass bulb 114. The glass bulb 114 is supported against the sealing assembly 112 by the frame body 110 by a load or compression screw 115. In its thermal response to the fire, at a desired activation time, the bulb 114 ruptures thereby releasing its support from the sealing assembly which is preferably ejected from the sealing assembly by the ejection spring 117. The trigger 114 has a thermal response that is preferably faster than fast response, such as for example, a Super Fast response to realize a desired activation time. In one particular embodiment, the preferred trigger has a response time index (RTI) of 24 (m-s)½ with a preferred temperature rating of 175° F. or more preferably 200° F. Thermally responsive triggers can be alternatively embodied as links or strut and lever assemblies as known in the art. Alternatively or additionally, the desired activation time and/or thermal responsiveness can be realized by the combination of a thermally responsive trigger and appropriate sprinkler body frame geometry that directs heat toward the trigger to provide for the desired activation response. An exemplary frame is shown and described in PCT Patent Application Publication No. WO 2014/047485.

Once the sprinkler is actuated, water or other firefighting fluid delivered to the inlet 110*a* at the working or operating pressure of the sprinkler is discharged from the outlet 110*b* and impacts the sprinkler fluid distribution components to address a fire including, for example, the trepan 110*e* and/or the deflector 116. For the preferred sprinkler 100, water delivered at a preferred working pressure ranging between 7 psi. to 175 psi. is distributed to define a preferred coverage area, which preferably varies with the discharge coefficient or K-Factor of the sprinkler. The preferred sprinkler 100 defines a preferred minimum sprinkler-to-sprinkler spacing SP of 8 ft. over an area of greater than 225 square feet or alternatively, a minimum sprinkler-to-sprinkler spacing SP of 7 ft. over an area 225 square feet or less. For the preferred sprinkler 100 defining a K-Factor of 4.2 gpm/psi$^{1/2}$, the sprinkler provides a preferred coverage area of 196 sq. ft. to define a maximum sprinkler-to-sprinkler spacing SP of 14 ft.; and for the preferred sprinkler 100 defining a K-Factor of 5.6 gpm/psi$^{1/2}$, the sprinkler provides a preferred coverage area of 256 sq. ft. to define a maximum sprinkler-to-sprinkler spacing SP of 16 ft.; alternatively the sprinkler provides a preferred coverage area of 400 square feet to define a preferred maximum sprinkler-to-sprinkler spacing SP of twenty feet (20 ft.).

Referring again to FIGS. 1-6, shown are the preferred embodiments of combustible concealed spaces CS and fire protection systems 10. Particularly shown, are the relative locations of a preferred sprinkler for the varying embodiments of a concealed space CS. The preferred automatic sprinkler 100 for use in the preferred concealed spaces, systems and methods described herein defines an effective depth range that can measure from a minimum of six inches (6 in.) to a preferred maximum greater than thirty-six inches (36 in.), preferably up to a maximum of at least sixty-inches (60 in.) and in a preferred embodiment up to a maximum of no more than eighty-four inches (84 in.). Accordingly, the preferred systems described herein can provide for protected concealed spaces with an effective depth range at one foot or half-foot increments over three feet for an appropriate vertical spacing between the upper deck UD and the ceiling deck CD. The concealed spaces and systems can be configured as wet systems or dry systems, as is understood in the art. In one preferred embodiment of the wet system, the system is hydraulically designed with a hydraulically remote or design area of 1000 (sq. ft.) square feet with a design density of 0.1 gpm/sq. ft. In one preferred embodiment of the dry system, the system is hydraulically designed with a hydraulically remote or design area of 1300 (sq. ft.) square feet with a design density of 0.1 gpm/sq. ft. or less and more preferably 0.07 gpm/sq. ft.

Shown in FIG. 1, the concealed space CSa shows each of the upper deck UD and ceiling deck CD with either an unobstructed wood truss T construction or an unobstructed bar joist construction with an upper chord member of 4 inches or less in vertical length. As shown, the fluid supply pipe 12 is preferably CPVC pipe with one or more parallel portions 12*a* extending parallel to the longitudinal axis A-A. One or more of the preferred sprinklers 100 are coupled to the parallel portion 12*a* of the piping 12. The deflectors 116 of the one or more sprinklers 100 are preferably spaced at a distance CL from the upper deck UD that ranges from a minimum of 1¹⁄₁₂ inches to a maximum of 4 inches. For the concealed space CSa, the one or more sprinklers 100 are positioned and spaced to provide an effective depth range D from a preferred minimum distance of six inches (6 in.) between the top surface TS of the bottom chord and the bottom surface BS of the upper chord to a distance between the upper deck UD and the ceiling deck CD that preferably measures no more than a maximum sixty inches (60 in.). More preferably, the effective depth range D extends over a range from a minimum of at least six inches (6 in.), preferably greater than thirty-six inches (36 in.) up to a maximum of sixty inches (60 in.).

In another preferred aspect, the sprinkler 100 and its central vertical axis is preferably spaced from a lateral face of a wood truss T at a preferred minimum spacing distance LD of 4½ inches. In other preferred aspects, the parallel pipe portion 12*a* has a bottom surface relative to the ceiling deck CD. The bottom surface of the parallel pipe portion 12*a* is preferably spaced from the ceiling deck CD at a distance PD being one of and more preferably the smaller of: (i) 6 inches maximum above the ceiling deck CD; (ii) 6 inches maximum above non-combustible ceiling insulation disposed along the ceiling deck (not shown); and (iii) ⅓ the distance between the upper and ceiling decks UD, CD.

Figure 2:
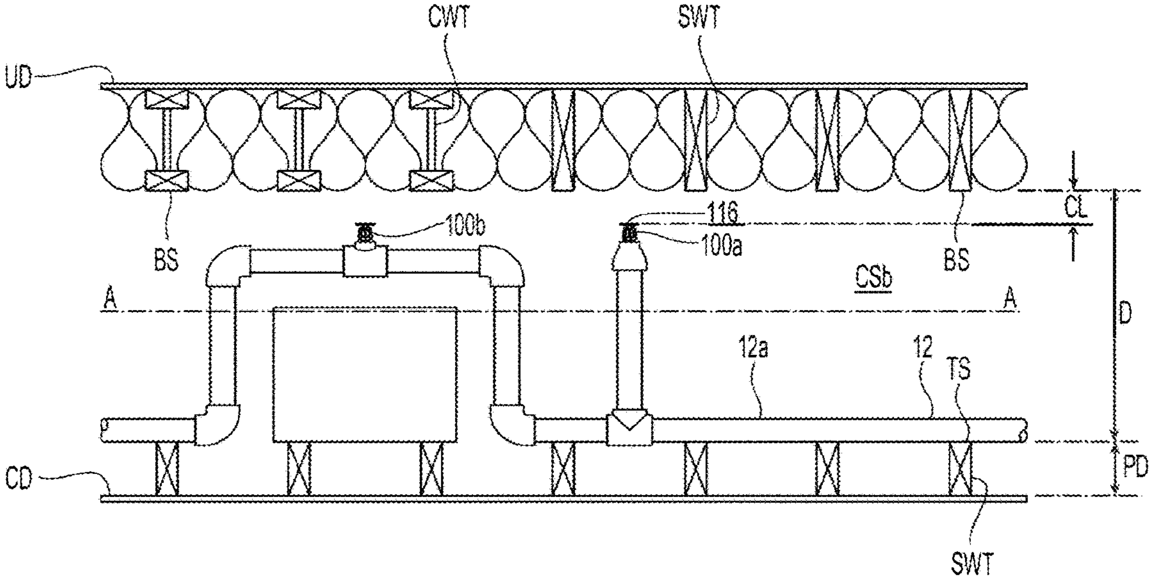
FIG. 2 is a cross-sectional elevation view of a second embodiment of a preferred combustible concealed space and fire protection system.

Shown in FIG. 2, the concealed space CSb shows each of the upper deck UD and ceiling deck CD with either non-combustible insulation-filled solid wood joist SWT construction or non-combustible insulation-filled composite wood joist CWT construction. As shown, the fluid supply pipe 12 is preferably CPVC pipe with one or more parallel portions 12*a* extending parallel to the longitudinal axis A-A. One or more of the preferred sprinklers 100 are coupled to the parallel portion 12*a* of the piping 12. The deflectors 116 of the one or more sprinklers 100 are preferably spaced at a distance CL from the upper deck joist members from a minimum of 1 1/12 inches to a maximum of 4 inches. For the concealed space CSb, the effective depth range D between the bottom and top surfaces BS, TS of the respective joists at the upper deck UD and ceiling deck CD preferably measures between 6 inches to 60 inches. In other preferred aspects, the parallel pipe portion 12*a* has a bottom surface relative to the ceiling deck CD. The bottom surface of the parallel pipe portion 12*a* is preferably spaced from the ceiling deck CD at a distance PD being one of and more preferably the smaller of: (i) 6 inches maximum above the ceiling deck CD; (ii) 6 inches maximum above non-combustible ceiling insulation disposed along the ceiling deck (not shown); and (iii) ⅓ the distance between the ceiling deck CD to the bottom surface of the upper deck joist member.

Figure 3:
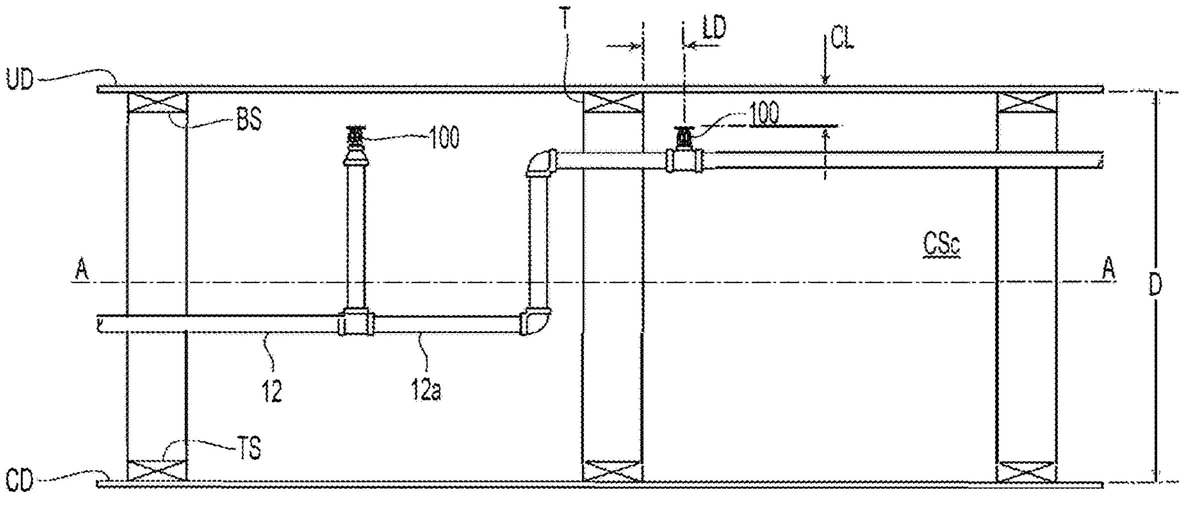
FIG. 3 is a cross-sectional elevation view of a third embodiment of a preferred combustible concealed space and fire protection system.

Shown in FIG. 3 is another alternate embodiment of the concealed space CSc shows each of the upper deck UD and ceiling deck CD with either of unobstructed wood truss T construction and unobstructed bar joist construction with an upper chord member of 4 inches or less in vertical length. As shown, the fluid supply pipe 12 is preferably steel pipe with one or more parallel portions 12*a* extending parallel to the longitudinal axis A-A. One or more of the preferred sprinklers 100 are coupled to the parallel portion 12*a* of the piping 12. The deflectors 116 of the one or more sprinklers 100 are preferably spaced at a distance CL from the upper deck UD that ranges from a minimum of 1 1/12 inches to a maximum of 4 inches. For the concealed space CSc, the effective depth range D is provided from a preferred minimum distance of six inches (6 in.) between the top surface TS of the bottom chord and the bottom surface BS of the upper chord to a maximum distance between the upper deck UD and the ceiling deck CD that is preferably no more than a maximum eighty-four inches. In another preferred aspect, the sprinkler 100, and more particularly its vertical central axis, is preferably spaced from a lateral face of a wood truss T at a preferred minimum spacing distance LD of 4½ inches.

Figure 4:
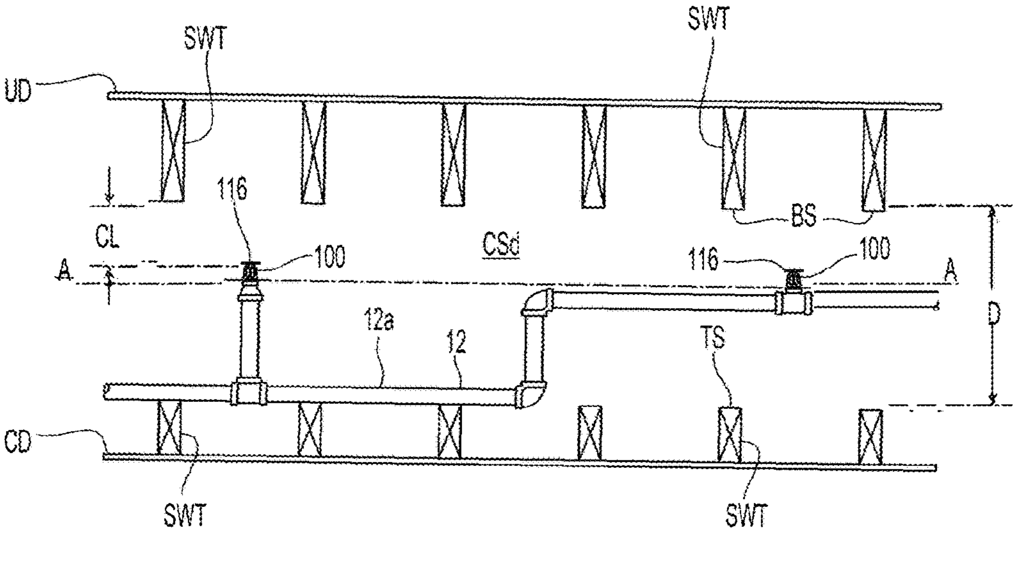
FIG. 4 is a cross-sectional elevation view of a fourth embodiment of a preferred combustible concealed space and fire protection system.
Figure 5:
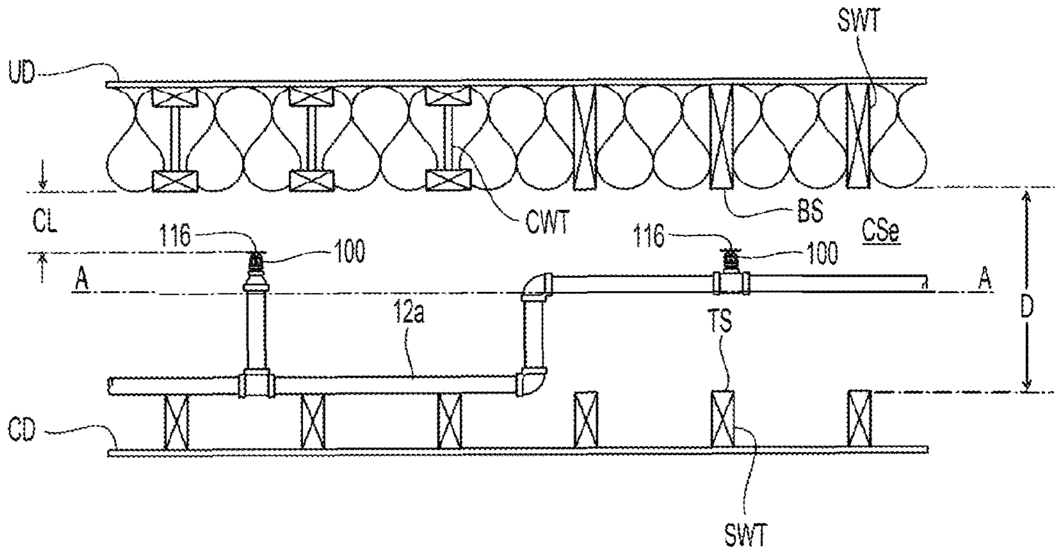
FIG. 5 is a cross-sectional elevation view of a fifth embodiment of a preferred combustible concealed space and fire protection system.
Figure 6:
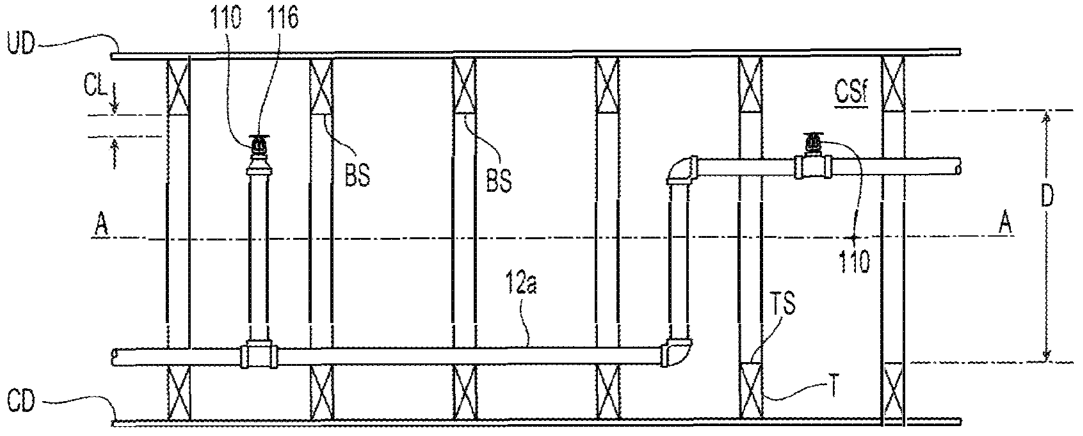
FIG. 6 is a cross-sectional elevation view of a fifth embodiment of a preferred combustible concealed space and fire protection system.

Shown in FIGS. 4, 5 and 6 are alternate concealed spaces CSd, CSe, CSf in which the preferred fluid supply pipe 12 is steel pipe. The concealed space CSd of FIG. 4 shows the upper and ceiling decks UD, CD of solid wood joist SWT construction. Each of the joists define surfaces relative to the longitudinal axis A-A, including a bottom surface BS for joists disposed along the upper deck CD and top surfaces TS for joists disposed along the ceiling deck CD. The top surface TS is spaced from the bottom surface BS for a provided effective depth range D that preferably measures from six inches to sixty inches. For the preferred systems shown, the deflectors 116 of the sprinklers 100, are preferably spaced from the bottom surface BS of the solid wood joists SWT of the upper deck at a distance CL that ranges from 1 1/12 inches to two inches (2 in.).

The concealed space CSe of FIG. 5 shows the upper and ceiling decks UD, CD of either non-combustible insulation-filled solid wood joist SWT construction or non-combustible insulation-filled composite wood joist CWT construction. Each of the joists SWT, CWT define surfaces relative to the longitudinal axis A-A, including a bottom surface BS for joists disposed along the upper deck CD and top surfaces TS for joists disposed along the ceiling deck CD. The top surface TS is spaced from the bottom surface BS for a provided effective depth range D that preferably measures from six inches to sixty inches. For the preferred systems shown, the deflectors 116 of the sprinklers 100, are preferably spaced from the bottom surface BS of the joists of the upper deck UD at a distance CL that ranges from 1 1/12 inches to four inches (4 in.).

The concealed space CSf of FIG. 6 shows the upper and ceiling decks UD, CD of obstructed wood truss T construction with an upper chord member having a vertical length of greater 4 inches or greater. Each of the trusses T defines surfaces relative to the longitudinal axis A-A, including a bottom surface BS of the upper chord member and a top surface TS of the lower or bottom chord member. The top surface TS is spaced from the bottom surface BS for a provided effective depth range D that preferably measures from six inches to sixty inches (6-60 in.). For the preferred systems shown, the deflectors 116 of the sprinklers 100, are preferably spaced from the bottom surface BS of the trusses of the upper deck UD at a distance CL that ranges from 1 1/12 inches to two inches (2 in.).

In view of the preferred concealed space and system descriptions preferred methods of concealed space fire protection is provided. One preferred method of concealed space fire protection includes obtaining an automatic upright sprinkler that includes a frame body having an inlet for receipt of a firefighting fluid, an outlet and a passageway extending between the inlet and the outlet to define a discharge coefficient of a nominal K-Factor, a seal assembly, a thermally responsive trigger to support the seal assembly in the outlet; and a deflector coupled to the frame body and spaced from the outlet for distribution of the firefighting fluid; and distributing the automatic sprinkler for installation in a combustible concealed space between an upper deck portion and a ceiling deck portion to define an effective depth range D measuring from a minimum of six inches to at least sixty inches (6-60 in.) and preferably from greater than thirty six-inches to at least sixty inches and more preferably to a maximum of no greater than eighty-four inches. As used herein, “obtaining” can include any one of purchasing, manufacturing or otherwise acquiring; and “distributing” can include any one of selling, providing, or supplying. In another preferred embodiment, a method of combustible concealed space fire protection includes installing a fluid supply line between an upper deck portion and a ceiling deck portion of a combustible concealed space with an effective depth range D measuring from a minimum of six inches to at least sixty inches (6-60 in.) and preferably from greater than thirty six-inches to at least sixty inches and more preferably to a maximum of no greater than eighty-four inches. The preferred method further includes coupling an automatic fire protection sprinkler with a portion of the supply line substantially parallel to the upper deck and a ceiling for protection over the effective depth.

The systems and methods described herein provide for an effective depth range from six inches to over thirty-six inches including the range of six inches to at least sixty inches (6-60 in.) to the largest range of six-inches to no more than eighty-four inches. It should be understood that other effective depth ranges can be realized such as, for example, ranges that increase at six inch increments over thirty-six inches such that the range is greater than previously known ranges. For example, other effective depth ranges may include: (i) six inches to forty-two inches (6 in.-42 in.); (ii) six inches to forty-eight inches (6 in.-48 in.); and (iii) six inches to fifty-four inches (6 in.-54 in.). Effective depth ranges larger than the preferred range of six to sixty inches (6 in.-60 in.) are also possible including, for example: (i) six inches to sixty-six inches (6 in.-66 in.); (ii) six inches to seventy-two inches (6 in.-72 in.); and (iii) six inches to seventy-eight inches (6 in.-78 in.). Although the minimum value of the ranges is preferably six inches, the minimum value can be any value that when compared with the maximum value provides a ranges that is greater than previously known values. For example, the minimum value can be greater than six inches, such as, twelve inches and the maximum of value of forty-two or eighty-four inches.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire protection system for protection of a combustible concealed space having an upper deck and a ceiling deck spaced about a longitudinal axis extending parallel to the ceiling deck defining an effective depth range between the upper deck and the ceiling deck in a direction perpendicular to the longitudinal axis, the effective depth range greater than six inches and not to exceed eighty-four inches, the system comprising:

- a firefighting fluid supply pipe having a parallel portion relative to the longitudinal axis; and
- at least one automatic upright sprinkler coupled to the firefighting fluid supply pipe within the combustible concealed space, the at least one automatic upright sprinkler having a coverage area greater than or equal to 144 square feet and less than or equal to 256 square feet with a design density over the combustible concealed space of at least 0.1 gpm/sq. ft., and including:
  - a frame body having an inlet for receipt of a firefighting fluid, an outlet with a passageway extending between the inlet and the outlet to define a discharge coefficient of a nominal K-Factor, wherein the passageway and the outlet of the at least one automatic upright sprinkler defines a nominal K-Factor of 5.6K with a sprinkler-to-sprinkler spacing ranging from 8 feet to 16 feet,
  - a seal assembly,
  - a thermally responsive glass bulb having a temperature rating of 200 degrees Fahrenheit to support the seal assembly in the outlet; and
  - a deflector coupled to the frame body and spaced from the outlet for distribution of the firefighting fluid.

2. The fire protection system of claim 1, wherein the thermally responsive glass bulb has a response time index (RTI) of 24 $(m\text{-}s)^{1/2}$.

3. The fire protection system of claim 1, wherein the at least one automatic upright sprinkler defines a maximum sprinkler-to-sprinkler spacing greater than 12 feet.

4. The fire protection system of claim 3, wherein the passageway and the outlet of the at least one automatic upright sprinkler defines the maximum sprinkler-to-sprinkler spacing of 16 feet.

5. The fire protection system of claim 1, wherein the firefighting fluid supply pipe is CPVC pipe and the upper deck is one of unobstructed wood truss construction and unobstructed bar joist construction, the deflector is spaced at a distance from the upper deck ranging from 1 1/12 inches to 4 inches with the effective depth range between the upper deck and the ceiling deck measuring no more than 60 inches.

6. The fire protection system of claim 5, wherein the at least one automatic upright sprinkler has a central vertical axis spaced from a lateral face of a wood truss at a minimum spacing distance of 4½ inches.

7. The fire protection system of claim 5, wherein the parallel portion having a bottom surface relative to the ceiling deck, the bottom surface being spaced from the ceiling deck at a distance being one of: (i) 6 inches maximum above the ceiling deck; (ii) 6 inches maximum above non-combustible ceiling insulation disposed along the ceiling deck; and (iii) ⅓ the distance between the upper deck and the ceiling deck.

8. The fire protection system of claim 1, wherein the firefighting fluid supply pipe is CPVC pipe and the upper deck is one of noncombustible insulation-filled solid wood or composite wood joist construction, the deflector is spaced at a distance from the upper deck ranging from 1 1/12 inches to 4 inches.

9. The fire protection system of claim 8, wherein the parallel portion having a bottom surface relative to the ceiling deck, the bottom surface being spaced from the ceiling deck at a distance being one of (i) 6 inches maximum above the ceiling deck; (ii) 6 inches maximum above non-combustible ceiling insulation disposed along the ceiling deck; and (iii) ⅓ the distance between the ceiling deck to a bottom surface of an upper deck joist member.

10. The fire protection system of claim 1, wherein the firefighting fluid supply pipe is steel pipe and the upper deck is one of unobstructed wood truss construction and unobstructed bar joist construction, the deflector is spaced at a distance from the upper deck ranging from 1 1/12 inches to 4 inches.

11. The fire protection system of claim 10, wherein the at least one automatic upright sprinkler has a central vertical axis spaced from a lateral face of a wood truss at a minimum spacing distance of 4½ inches.

12. The fire protection system of claim 1, wherein the firefighting fluid supply pipe is steel pipe and the upper and ceiling decks being any one of (i) solid wood joist construction; (ii) non-combustible insulation-filled solid wood or composite wood joist construction; or (iii) obstructed wood truss construction, the deflector being spaced at a distance from a bottom surface of joists of the upper deck ranging from 1 1/12 inches to at least 2 inches.

13. The fire protection system of claim 12, wherein the upper and ceiling decks are of non-combustible insulation-filled solid wood or composite wood joist construction, the deflector being spaced from the bottom surface of joists of the upper deck with the distance being no more than a maximum 4 inches.

14. A method of for protecting a combustible concealed space comprising:

obtaining a fire protection system comprising:

a firefighting fluid supply pipe having a parallel portion, at least one automatic upright sprinkler coupled to the firefighting fluid supply pipe within the combustible concealed space, the at least one automatic upright sprinkler having a coverage area greater than or equal to 144 square feet and less than or equal to 256 square feet with a design density over the combustible concealed space of at least 0.1 gpm/sq. ft., and including:

a frame body having an inlet for receipt of a firefighting fluid, an outlet with a passageway extending between the inlet and the outlet to define a discharge coefficient of a nominal K-Factor, wherein the passageway and the outlet of the at least one automatic upright sprinkler defines a nominal K-Factor of 5.6K with a sprinkler-to-sprinkler spacing ranging from 8 feet to 16 feet, a seal assembly, a thermally responsive glass bulb having a temperature rating of 200 degrees Fahrenheit to support the seal assembly in the outlet, and a deflector coupled to the frame body and spaced from the outlet for distribution of the firefighting fluid; and distributing the fire protection system for installation in the combustible concealed space having an upper deck and a ceiling deck spaced about a longitudinal axis extending parallel to the ceiling deck defining an effective depth range between the upper deck and the ceiling deck in a direction perpendicular to the longitudinal axis, the effective depth range greater than six inches and not to exceed eighty-four inches, wherein the parallel portion of the firefighting fluid supply pipe is parallel relative to the longitudinal axis.

15. The method of claim 14, wherein the thermally responsive glass bulb has a response time index (RTI) of 24 $(m\text{-}s)^{1/2}$.

16. The method of claim 14, wherein the at least one automatic upright sprinkler defines a maximum sprinkler-to-sprinkler spacing greater than 12 feet.

17. The method of claim 16, wherein the passageway and the outlet of the at least one automatic upright sprinkler defines the maximum sprinkler-to-sprinkler spacing of 16 feet.

18. The method of claim 14, wherein the firefighting fluid supply pipe is CPVC pipe and the upper deck is one of unobstructed wood truss construction and unobstructed bar joist construction, the deflector is spaced at a distance from the upper deck ranging from 1 1⁄12 inches to 4 inches with the effective depth range between the upper deck and the ceiling deck measuring no more than 60 inches.

19. The method of claim 18, wherein the at least one automatic upright sprinkler has a central vertical axis spaced from a lateral face of a wood truss at a minimum spacing distance of 4½ inches.

20. The method of claim 18, wherein the parallel portion having a bottom surface relative to the ceiling deck, the bottom surface being spaced from the ceiling deck at a distance being one of: (i) 6 inches maximum above the ceiling deck; (ii) 6 inches maximum above non-combustible ceiling insulation disposed along the ceiling deck; and (iii) ⅓ the distance between the upper deck and the ceiling deck.

21. The method of claim 14, wherein the firefighting fluid supply pipe is CPVC pipe and the upper deck is one of noncombustible insulation-filled solid wood or composite wood joist construction, the deflector is spaced at a distance from the upper deck ranging from 1 1⁄12 inches to 4 inches.

22. The method of claim 21, wherein the parallel portion having a bottom surface relative to the ceiling deck, the bottom surface being spaced from the ceiling deck at a distance being one of (i) 6 inches maximum above the ceiling deck; (ii) 6 inches maximum above non-combustible ceiling insulation disposed along the ceiling deck; and (iii) ⅓ the distance between the ceiling deck to a bottom surface of an upper deck joist member.

23. The method of claim 14, wherein the firefighting fluid supply pipe is steel pipe and the upper deck is one of unobstructed wood truss construction and unobstructed bar joist construction, the deflector is spaced at a distance from the upper deck ranging from 1 1⁄12 inches to 4 inches.

24. The method of claim 23, wherein the at least one automatic upright sprinkler has a central vertical axis spaced from a lateral face of a wood truss at a minimum spacing distance of 4½ inches.

25. The method of claim 14, wherein the firefighting fluid supply pipe is steel pipe and the upper and ceiling decks being any one of (i) solid wood joist construction; (ii) non-combustible insulation-filled solid wood or composite wood joist construction; or (iii) obstructed wood truss construction, the deflector being spaced at a distance from a bottom surface of joists of the upper deck ranging from 1 1⁄12 inches to at least 2 inches.

26. The method of claim 25, wherein the upper and ceiling decks are of non-combustible insulation-filled solid wood or composite wood joist construction, the deflector being spaced from the bottom surface of joists of the upper deck with the distance being no more than a maximum 4 inches.

* * * * *